United States Patent [19]

Zaydel

[11] 4,372,718
[45] Feb. 8, 1983

[54] TAIL LAMP ATTACHMENT

[75] Inventor: Wieslaw S. Zaydel, Rochester, Mich.

[73] Assignee: General Motors Corporation, Detroit, Mich.

[21] Appl. No.: 203,390

[22] Filed: Nov. 3, 1980

[51] Int. Cl.³ .............................................. F16B 27/00
[52] U.S. Cl. ..................................... 411/366; 411/389
[58] Field of Search ................ 411/338, 388, 389, 366; 403/299

[56] References Cited

U.S. PATENT DOCUMENTS

| | | | |
|---|---|---|---|
| 1,150,114 | 8/1915 | Hays | 411/338 |
| 4,157,674 | 6/1979 | Carlson | 411/389 |
| 4,186,645 | 2/1980 | Zaydel | 411/389 |

FOREIGN PATENT DOCUMENTS 43573 11/1908 Switzerland ......................... 411/338

Primary Examiner—Robert L. Wolfe
Attorney, Agent, or Firm—Charles E. Leahy

[57] ABSTRACT

The invention provides a new and improved fastener for attaching a tail lamp assembly to an apertured vehicle body panel. According to the invention, a stud member has a first shank portion which is externally threaded for threaded attachment within a threaded aperture of the tail lamp assembly. A second shank portion of the stud member has internal threads formed therein and a smooth outer cylindrical surface which is adapted for non-interfering insertion through an aperture of the vehicle body panel. A nut member includes a screw encapsulated within a molded nut. The molded nut has a bearing surface adapted to engage against the panel member and the screw has an external screw thread adapted for threaded engagement within the internal threads of the stud member second shank portion so that the tail lamp device is attached to the panel. A cup-shaped retainer is preferably carried by the stud member axially intermediate the first and second shank portions and has an outer peripheral rim adapted to bear against the face of the panel to limit insertion of the stud member into the panel aperture. The cup-shaped retainer also has a recessed cup portion radially intermediate the stud member and the peripheral rim adapted to retain a seal in a sealing interposition between the fastener and the panel.

3 Claims, 4 Drawing Figures

TAIL LAMP ATTACHMENT

The invention relates to an arrangement for fastening a device to an apertured panel and more particularly an improved fastener arrangement facilitating the attachment of a tail lamp assembly having a plurality of mounting studs adapted for insertion through a mating plurality of apertures in a motor vehicle body panel.

BACKGROUND OF THE INVENTION

Motor vehicle tail lamp assemblies conventionally include a housing which contains a plurality of bulb sockets for turn signals, tail lights and stop lights. The lamp housing is conventionally of die cast metal or injection-molded plastic and has a plurality of integral mounting projections which extend from the forward surface thereof and are adapted for insertion through mating apertures of the motor vehicle body panel to which the lamp assembly is to be mounted.

The prior art lamp assemblies are conventionally attached to the body panel as shown in FIG. 2 by the provision of an externally threaded stud having one end threadedly engaged in the integral mounting projection of the lamp housing. The lamp assembly is attached to the body panel by a plurality of nuts which are threadedly engaged on the studs subsequent to their insertion through the body apertures.

A shortcoming of the aforedescribed prior art tail lamp mounting arrangement is that the external threads on the mounting stud are susceptible to a rasping interference with the walls of the body apertures unless the lamp assembly is perfectly aligned with the apertures during assembly and disassembly. Because such a precise alignment is difficult to achieve in the real world of vehicle assembly as well as disassembly and reassembly for vehicle service, it has been found necessary to enlarge the dimension of the apertures in the vehicle body so that the tail lamp assembly may be assembled and disassembled with relative ease. However, it has been found that oversizing the body apertures permits the lamp assembly to be assembled in an imperfect or tilted position.

SUMMARY OF THE INVENTION

The invention provides a new and improved fastener for attaching a lamp assembly to an apertured vehicle body panel. According to the invention, a stud member has a first shank portion which is externally threaded for threaded attachment within a threaded aperture of the tail lamp device. A second shank portion of the stud member has internal threads formed therein and a smooth outer cylindrical surface which is adapted for non-interfering insertion through an aperture of the vehicle body panel. A nut member includes a screw encapsulated within a molded nut. The molded nut has a bearing surface adapted to engage against the panel member and the screw has an external screw thread adapted for threaded engagement within the internal threads of the stud member second shank portion so that the tail lamp device is attached to the panel. A cup-shaped retainer is preferably carried by the stud member axially intermediate the first and second shank portions and has an outer peripheral rim adapted to bear against the face of the panel to limit insertion of the stud member into the panel aperture. The cup-shaped retainer also has a recessed cup portion radially intermediate the stud member and the peripheral rim adapted to retain a seal in sealing interposition between the fastener and the panel.

BRIEF DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
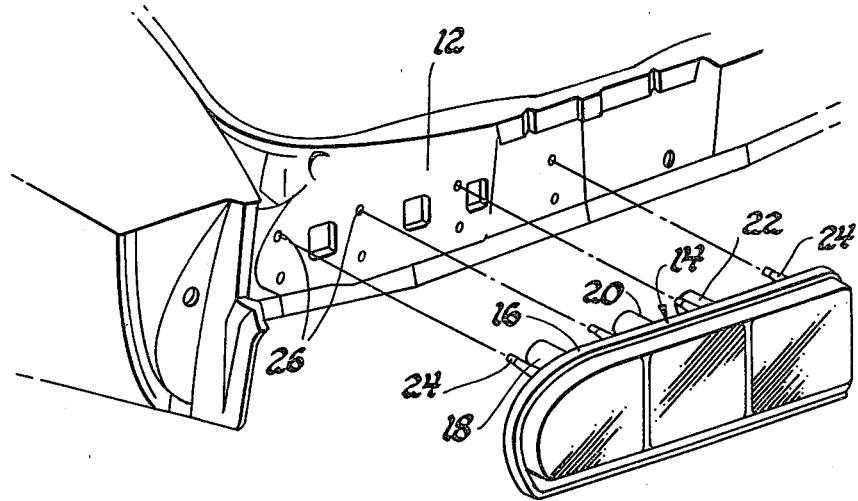
FIG. 1 is a perspective view of a vehicle body showing the apertured vehicle body panel and a lamp assembly for mounting upon the vehicle body.

Referring to FIG. 1, there is shown a vehicle body comprised of a plurality of stamped steel body panels which are welded together. The vehicle body includes a rear body panel 12 to which a tail lamp assembly 14 is to be attached. The lamp assembly 14 includes a die cast metal or injection-molded housing 16 which mounts a plurality of bulb sockets 18, 20 and 22. The housing 16 has a plurality of integral mounting projections 24 formed integrally therewith and adapted for insertion through an aligned one of a plurality of mating apertures 26 provided in the body panel 12.

Figure 2:
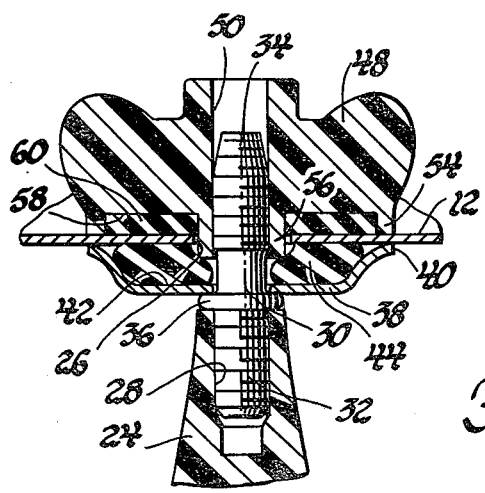
FIG. 2 is a cross-sectional view of a prior art tail lamp attachment for a vehicle body.

Referring to FIG. 2, there is shown a prior art fastener arrangement for connecting the lamp assembly 14 to the body panel 12. As seen in FIG. 2, the projection 24 has an internally threaded recess 28. A stud member 30 has a first externally threaded shank portion 32 which is threadedly engaged within the recess 28 and a second shank portion 34 which is also externally threaded and extends axially from the projection 24. The stud 30 also has an integral shoulder 36 which seats a cup-shaped retainer 38. The cup-shaped retainer 38 has an outer peripheral rim 40 which is adapted to bear against the body panel 12 to limit insertion of the stud 30 into the panel aperture 26. The cup-shaped retainer 38 also has a recessed cup portion 42 radially intermediate the stud 30 and the peripheral rim 40 in order to retain an annular seal 44 in sealing position between the panel 12 and stud 30.

A nut 48, preferably of molded plastic, has a central axially extending bore 50 in which threads are formed when the nut 48 is spun on to the stud 30. The second shank portion 34 is tapered at its outer end to facilitate starting of the nut 48 onto the stud 30. The nut 48 has an outer flange 54 adapted to bear against the panel 12 and an inner skirt 56 which extends through the body panel aperture 26. The outer flange 54 and inner skirt 56 define a recess 58 which seats an annular seal 60.

The shortcoming of the aforedescribed FIG. 2 prior art tail mounting arrangement is that the external threads on the second shank portion 34 of mounting stud 30 are susceptible to a rasping interference with the walls of the body apertures 26 unless the lamp assembly is perfectly aligned with the apertures during assembly and disassembly. Because such a precise alignment is difficult to achieve in the real world of vehicle assembly as well as disassembly and reassembly for vehicle service, it has been found necessary in the prior art to enlarge the dimension of the apertures 26 so that the tail lamp assembly 14 may be assembled and disassembled with relative ease. However, it has been found that oversizing the body apertures 26 permits the lamp assembly 14 to be assembled in an imperfect or tilted position.

Figure 3:
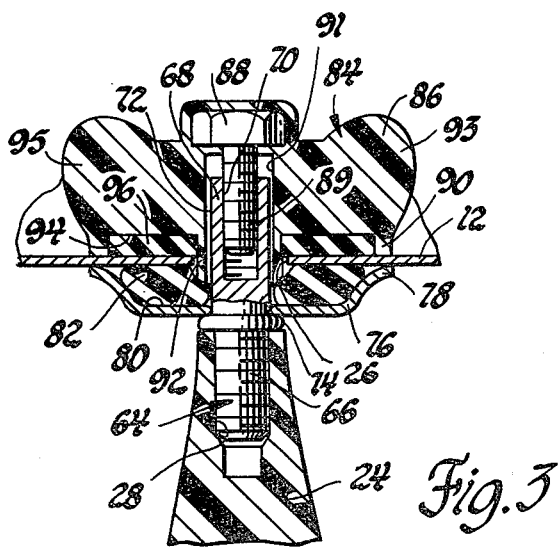
FIG. 3 is a sectional view similar to FIG. 2 and showing a first embodiment of the present invention.

Referring to FIG. 3, there is shown an improved tail lamp attachment. A stud 64 has a first externally threaded shank portion 66 which is threadedly engaged within the recess 28 of housing projection 24 and a second shank portion 68 which has an internally threaded bore 70 and a smooth outer cylindrical surface 72. The stud 64 also has an integral shoulder 74 which seats a cup-shaped retainer 76. The cup-shaped retainer 76 has an outer peripheral rim 78 which is adapted to bear against the body panel 12 to limit insertion of the stud 64 into the panel aperture 26. The cup-shaped retainer 76 also has a recessed cup portion 80 radially intermediate the stud 64 and the peripheral rim 78 in order to retain an annular seal 82 in sealing position between the panel 12 and stud 30.

A nut member 84 includes a molded plastic nut 86 having a screw 88 encapsulated therein. A threaded shank 89 of the screw 88 extends through a central bore 91 of the nut 84. The nut 84 is preferably shaped as a wing nut and has wing portions 93 and 95 which may be gripped by the assembler. Nut 84 also has an outer flange 90 adapted to bear against the panel 12 and an axially extending inner skirt 92 adapted to extend through the body panel aperture 26. The outer flange 90 and inner skirt 92 define a recess 94 which seats an annular seal 96.

Attachment of the tail lamp assembly 14 to the vehicle body 10 is made by inserting the studs 64 through the mating apertures 26. The smooth outer cylindrical surfaces 72 of the studs 64 assure non-interfering insertion of the studs through the particular mating aperture of the body panel 12. The nut member 84 and its threaded shank 89 is aligned with the internally threaded bore 70 of the stud 64. The nut member 84 is spun onto the stud 68 until the outer flange 90 of the nut 86 engages one side of the panel 12 and the rim 78 of the cup-shaped retainer 76 engages the other side of the panel 12 so that the annular seals 82 and 96 are compressed into sealing engagement against the opposite sides of the panel.

Figure 4:
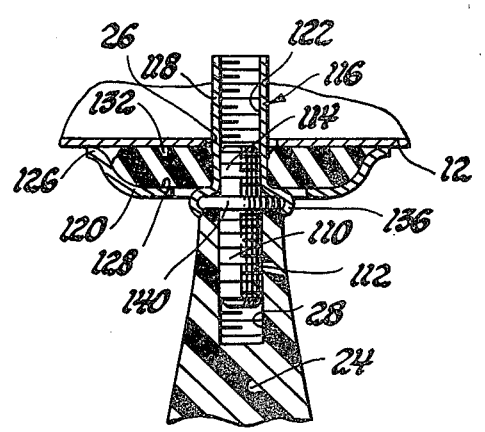
FIG. 4 is a view similar to FIGS. 2 and 3 and showing a second embodiment of the present invention.

Referring to FIG. 4, a second embodiment of the invention is shown. Stud 110 has a first externally threaded portion 112 which is threadedly engaged within the recess 28 of housing projection 24 and a second externally threaded portion 114. A retainer 116 includes an axially extending tubular sleeve portion 118 and a radially flared cup portion 120. The tubular sleeve portion 118 has internal threads 122 which threadedly receive the second shank portion 114 of the stud 110. The cup portion 120 of the retainer 116 defines an outer peripheral rim 126 which is adapted to bear against the body panel 12 to limit insertion of the tubular sleeve portion 118 into the panel aperture 26. A recess 128 is defined between the rim 126 and the tubular sleeve portion 118 to retain an annular seal 132 in sealing position between the panel 12 and the retainer 116. Tangs 136 are struck downwardly from the cup portion 120 and wrap around a shoulder 140 of the stud 110 to attach the retainer 116 to the stud.

The internal threads 122 of the retainer sleeve portion 118 are adapted to threadedly receive the threaded shank 89 of screw 88 in the same manner as shown in the embodiment of FIG. 3.

Thus it is seen that the invention provides a new and improved attachment of a tail lamp assembly to a vehicle panel wherein a smooth outer cylindrical surface provided on the attaching studs assures non-interfering insertion and removal of the tail lamp mounting studs relative the mating body panel apertures.

The embodiments of the invention in which an exclusive property or privilege is claimed are defined as follows:

1. A fastener for attaching a tail lamp assembly to a vehicle body panel having an aperture, said fastener comprising:

a stud member having a first shank portion adapted for attachment to the tail lamp assembly and a second shank portion having internal threads formed therein and a smooth outer cylindrical surface adapted for non-interfering insertion through the aperture of the panel; and.

a nut member including a screw encapsulated within a molded nut, said molded nut having a bearing surface adapted to engage against the panel member and said screw having external screw threads thereon adapted for threaded engagement within the second shank portion whereby the tail lamp assembly is attached to the panel.

2. A fastener for attaching a tail lamp assembly to a vehicle body panel having an aperture, said fastener comprising:

a stud member having a first shank portion adapted for attachment to the tail lamp assembly and a second shank portion having internal threads formed therein and a smooth outer cylindrical surface adapted for non-interfering insertion and removal through the aperture of the panel member;

a cup-shaped retainer carried by the stud member axially intermediate the first and second shank portions, said retainer having an outer peripheral rim adapted to bear against the face of the panel to limit insertion of the stud member into the aperture and a recessed cup portion radially intermediate the stud member and the peripheral rim thereof adapted to retain a sealant material in sealing interposition between the fastener and the panel; and a nut member including a molded nut having a bearing surface adapted to engage against the panel and a screw encapsulated within the molded nut and having external screw threads thereon adapted for threaded engagement within the second shank portion whereby the tail lamp assembly is sealingly attached to the panel.

3. A fastener for attaching a tail lamp assembly to a motor vehicle body panel having an aperture, said fastener including:

a threaded stud member for attachment to the tail lamp assembly;

a cup-shaped retainer including a tubular portion having internal threads formed therein threadedly receiving the stud member and a smooth outer cylindrical surface adapted for non-interfering insertion and removal through the aperture of the panel member, said retainer having a radially flared washer portion having an outer peripheral rim adapted to bear against the face of the panel to limit insertion of the stud member into the aperture and a recessed cup portion defined between the tubular portion and the rim adapted to retain a sealant material in sealing interposition between the fastener and the panel; and a nut member including a molded nut having a bearing surface adapted to engage against the panel member and a screw encapsulated within the molded nut and having external screw threads thereon adapted for threaded engagement within the internal threads of the tubular portion whereby the tail lamp assembly is sealingly attached to the panel.

* * * * *